(12) United States Patent
Yang

(10) Patent No.: US 12,375,935 B2
(45) Date of Patent: *Jul. 29, 2025

(54) METHOD FOR BEAM MANAGEMENT IN UNLICENSED BAND, TERMINAL DEVICE, AND NETWORK DEVICE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,517

(22) Filed: Feb. 29, 2024

(65) Prior Publication Data
US 2024/0205691 A1 Jun. 20, 2024

Related U.S. Application Data

(63) Continuation of application No. 17/126,043, filed on Dec. 18, 2020, now Pat. No. 11,950,102, which is a
(Continued)

(30) Foreign Application Priority Data

Jun. 22, 2018 (CN) .......................... 201810653289.5

(51) Int. Cl.
*H04W 16/14* (2009.01)
*H04L 5/00* (2006.01)
(Continued)

(52) U.S. Cl.
CPC ........... *H04W 16/14* (2013.01); *H04L 5/0048* (2013.01); *H04W 24/10* (2013.01); *H04W 72/046* (2013.01)

(58) Field of Classification Search
CPC ... H04W 16/14; H04W 24/10; H04W 72/046; H04W 74/0808; H04W 72/542;
(Continued)

(56) References Cited

U.S. PATENT DOCUMENTS

| | | | |
|---|---|---|---|
| 2019/0037605 A1* | 1/2019 | Agiwal | H04W 76/27 |
| 2019/0239207 A1* | 8/2019 | Tang | H04W 24/04 |

(Continued)

FOREIGN PATENT DOCUMENTS

| | | | |
|---|---|---|---|
| CN | 104579518 A | 4/2015 | |
| CN | 105472651 A | 4/2016 | |

(Continued)

OTHER PUBLICATIONS

3GPP TSG RAN WG1 #93 ; R1-1805828; Source: ZTE; Title: Remaining issues on beam management; Busan, Korea, May 21-25, 2018. (Year: 2018).*

(Continued)

*Primary Examiner* — Mohammed S Chowdhury
(74) *Attorney, Agent, or Firm* — IPX PLLC

(57) ABSTRACT

A method for beam management in an unlicensed band, a terminal device, and a network device are provided. The method includes: receiving, by a terminal device, a reference signal resource from a network device; measuring, by the terminal device, the reference signal resource in the unlicensed band, to obtain a beam measurement result; and sending, by the terminal device using an uplink resource for transmitting a beam report, the beam report comprising the beam measurement result.

20 Claims, 3 Drawing Sheets

Related U.S. Application Data continuation of application No. PCT/CN2019/090816, filed on Jun. 12, 2019.

(51) Int. Cl.
*H04W 24/10* (2009.01)
*H04W 72/044* (2023.01)

(58) Field of Classification Search
CPC ....... H04L 5/0048; H04L 5/001; H04B 7/063; H04B 7/0632
See application file for complete search history.

(56) References Cited

U.S. PATENT DOCUMENTS

| | | | | |
|---|---|---|---|---|
| 2020/0288479 | A1* | 9/2020 | Xi | H04W 76/27 |
| 2020/0373993 | A1* | 11/2020 | Wu | H04W 72/0446 |
| 2020/0374932 | A1* | 11/2020 | Chen | H04L 5/0055 |
| 2021/0235340 | A1* | 7/2021 | Moosavi | H04W 36/0094 |

FOREIGN PATENT DOCUMENTS

| | | |
|---|---|---|
| CN | 105636108 A | 6/2016 |
| CN | 106470432 A | 3/2017 |
| CN | 106470442 A | 3/2017 |
| CN | 107113648 A | 8/2017 |
| CN | 107439034 A | 12/2017 |
| CN | 107889113 A | 4/2018 |
| EP | 3300414 A | 3/2018 |

OTHER PUBLICATIONS

3GPP TSG RAN WG1 #93; Tdoc R1-1806217; Source: Ericsson; Title: Remaining issues on beam measurement and reporting; Busan, Korea, May 21-25, 2018. (Year: 2018).*

3GPP TSG RAN WG1 Meeting 90bis ; R1-1717897; Source: ASUSTeK; Title: Discussion on UL Beam Management; Prague, CZ, Oct. 9-13, 2017. (Year: 2017).*

International Search Report issued in corresponding International Application No. PCT/CN2019/090816, mailed Sep. 11, 2019, 4 pages.

Search Report issued in related Application No. 201810653289.5, mailed Mar. 23, 2020, 6 pages.

3GPP TSG RAN WG1 Meeting #93; R1-1805828; Source: ZTE; Title: Remaining issues on beam management; Busan, Korea, May 21-25, 2018.

3GPP TSG-RAN WG1 Meeting #93; R1-1806217; Source: Ericsson; Title: Remaining issues on beam measurement and reporting; Busan, Korea, May 21-25, 2018.

3GPP TSG RAN WG1 Meeting 90bis; R1-1717897; Source: ASUSTeK; Title: Discussion on UL Beam Management; Prague, CZ, Oct. 9-13, 2017.

* cited by examiner

METHOD FOR BEAM MANAGEMENT IN UNLICENSED BAND, TERMINAL DEVICE, AND NETWORK DEVICE

CROSS REFERENCE TO RELATED APPLICATIONS

This application is a continuation of U.S. application Ser. No. 17/126,043, filed on Dec. 18, 2020, which is a continuation of PCT Application No. PCT/CN2019/090816 filed Jun. 12, 2019, which claims priority to Chinese Patent Application No. 201810653289.5, filed on Jun. 22, 2018. The entire contents of each of the above-identified applications are expressly incorporated herein by reference.

TECHNICAL FIELD

The present disclosure belongs to the field of communications technologies, and in particular, to a method for beam management in an unlicensed band, a terminal device, a network device, and a computer readable storage medium.

BACKGROUND

In a future communications system, an unlicensed band may serve as supplement of a licensed band, and is used to help a carrier perform service capacity expansion. In a high band, a massive antenna device needs to receive and send data by using a beam. Before data receiving and sending, beam management needs to be performed, where the beam management includes beam measurement and beam reporting.

However, there is no solution for beam management in an unlicensed band. As a result, the unlicensed band cannot be effectively used, and a beam measurement result cannot be effectively used to perform beam indication in the unlicensed band.

SUMMARY

Embodiments of the present disclosure provide a method for beam management in an unlicensed band, a terminal device, a network device, and a computer readable storage medium.

According to a first aspect, an embodiment of the present disclosure provides a method for beam management in an unlicensed band, including: receiving a reference signal resource from a network device; measuring the reference signal resource in an unlicensed band, to obtain a beam measurement result; and sending, by using an uplink resource for transmitting a beam report, the beam report including the beam measurement result.

According to a second aspect, an embodiment of the present disclosure provides a method for beam management in an unlicensed band, including: sending a reference signal resource to a terminal device; and receiving a beam report from the terminal device, where the beam report is a beam report that is received on an uplink resource for transmitting the beam report and that includes a beam measurement result, and the beam measurement result is a measurement result obtained by the terminal device by measuring the reference signal resource in an unlicensed band.

According to a third aspect, an embodiment of the present disclosure provides a terminal device, including: a receiving module, configured to receive a reference signal resource from a network device; a measurement module, configured to measure the reference signal resource in an unlicensed band, to obtain a beam measurement result; and a sending module, configured to send, by using an uplink resource for transmitting a beam report, the beam report including the beam measurement result.

According to a fourth aspect, an embodiment of the present disclosure provides a terminal device, including: a memory, a processor, and a program stored in the memory and executable on the processor, where when the processor executes the program, the steps of the method according to the first aspect are performed.

According to a fifth aspect, an embodiment of the present disclosure provides a computer readable storage medium, where the computer readable storage medium stores a program, and when the program is executed by a processor, the steps of the method according to the first aspect are performed.

According to a sixth aspect, an embodiment of the present disclosure provides a network device, including: a sending module, configured to send a reference signal resource to a terminal device; and a receiving module, configured to receive a beam report from the terminal device, where the beam report is a beam report that is received on an uplink resource for transmitting the beam report and that includes a beam measurement result, and the beam measurement result is a measurement result obtained by the terminal device by measuring the reference signal resource in an unlicensed band.

According to a seventh aspect, an embodiment of the present disclosure provides a network device, including: a memory, a processor, and a program stored in the memory and executable on the processor, where when the processor executes the program, the steps of the method according to the second aspect are performed.

According to an eighth aspect, an embodiment of the present disclosure provides a computer readable storage medium, where the computer readable storage medium stores a computer program, and when the computer program is executed by a processor, the steps of the method according to the second aspect are performed.

BRIEF DESCRIPTION OF DRAWINGS

The following describes the accompanying drawings required in the embodiments of the present disclosure. Apparently, the accompanying drawings in the following descriptions show merely some embodiments of the present disclosure, and a person of ordinary skill in the art may still derive other accompanying drawings from these accompanying drawings without creative efforts.

DETAILED DESCRIPTION

Figure 1:
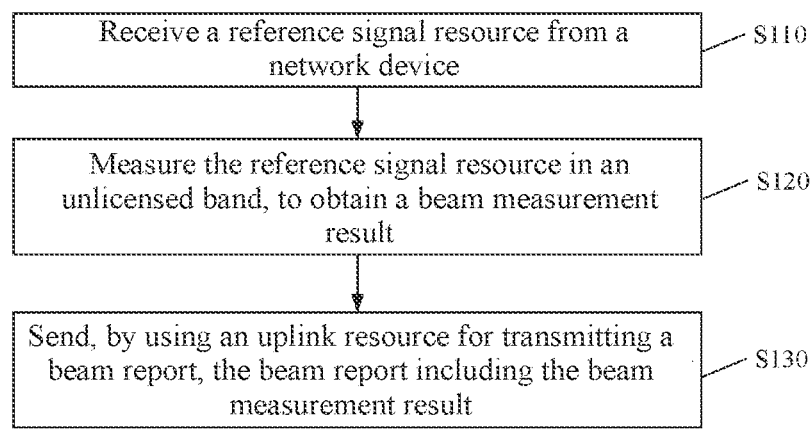
FIG. 1 is a schematic flowchart of a method for beam management in an unlicensed band according to some embodiments of the present disclosure.

Characteristics and exemplary embodiments of various aspects of the present disclosure are described below in detail. In the following detailed descriptions, many specific details are provided to thoroughly understand the present disclosure. However, it is clear to a person skilled in the art that the present disclosure can be implemented without some of these specific details. The following descriptions of the embodiments merely intend to provide examples of the present disclosure to better understand the present disclosure.

Radio access technology standards such as Long Term Evolution (LTE)/Long Term Evolution-Advanced (LTE-Advanced, LTE-A) are all constructed based on multiple-input multiple-output (MIMO) and orthogonal frequency division multiplexing (OFDM) technologies. The MIMO technology improves a peak rate and system spectrum utilization by using a spatial degree of freedom available in a multiple-antenna system.

In a standardization development process, dimensions of the MIMO technology are constantly expanded. In LTE release 8 (LTE Rel-8), a maximum of 4 layers of MIMO transmission can be supported. In LTE release 9 (LTE Rel-9), in an enhanced multi-user multiple-input multiple-output (Multi-User MIMO, MU-MIMO) technology, a maximum of 4 downlink data layers can be supported in MU-MIMO transmission of a transmission mode (TM)-8. In LTE release 10 (LTE Rel-10), a transmission capability of single-user multiple-input multiple-output (SU-MIMO) is expanded to a maximum of 8 data layers.

The industry is further pushing the MIMO technology towards a three-dimensional and large-scale direction. Currently, the 3rd Generation Partnership Project (3GPP) has completed a research project of 3D channel modeling, and is conducting research and standardization work of enhanced full dimension (eFD)-MIMO and New Radio (NR) MIMO. It may be predicted that a MIMO technology with a larger scale and more antenna ports will be introduced in a future $5^{th}$-generation (5G) mobile communications technology.

A large-scale antenna array is used in a massive multiple-input multiple-output (Massive MIMO) technology, so that system band utilization can be greatly improved and more access users can be supported. Therefore, major research organizations all regard the massive MIMO technology as one of most promising physical layer technologies in a next-generation mobile communications system.

In the massive MIMO technology, if an all-digital array is used, maximum spatial resolution and optimal MU-MIMO performance can be achieved. However, this structure requires a large number of analog-to-digital (AD)/digital-to-analog (DA) converters and a large number of complete radio frequency-baseband processing channels. As a result, both device costs and baseband processing complexity cause huge burden.

To avoid the foregoing implementation costs and device complexity, a digital-analog hybrid beamforming technology emerges, that is, based on traditional digital domain beamforming, a stage of beamforming is added near a front end of an antenna system for a radio frequency signal. The analog beamforming can achieve a rough match between a transmitted signal and a channel in a relatively simple way. A dimension of an equivalent channel formed by analog beamforming is less than an actual number of antennas. Therefore, a number of AD/DA converters and a number of digital channels required subsequently and corresponding baseband processing complexity can be all reduced greatly. Partial residual interference in analog beamforming may be processed again in a digital domain to ensure quality of MU-MIMO transmission. Compared with all-digital beamforming, digital-analog hybrid beamforming is a solution that balances performance and complexity, and has bright practical prospect in a high-band system with large bandwidth or a system with a very large number of antennas.

In research of a next-generation communications system after the fourth-generation (4G) communications technology, an operating band supported by a system is raised to more than 6 GHz, and a highest band is about 100 GHz. A high band has relatively abundant idle frequency resources, and can provide a greater throughput for data transmission. 3GPP has completed channel modeling work for a high frequency. A wavelength of a high frequency signal is short, compared with a low band, in a high band, more antenna array elements can be arranged on a panel of a same size, and a beamforming technology is used to form a beam with stronger directivity and a narrower lobe. Therefore, it is also one of future trends to combine large-scale antennas with high frequency communication.

In a future communications system, an unlicensed band may serve as supplement of a licensed band, and is used to help a carrier perform service capacity expansion. To keep consistent with deployment of NR and maximize NR-based unauthorized access as much as possible, an unlicensed band may operate in a band 5 GHz, a band 37 GHz, and a band 60 GHz. A high bandwidth (80 MHz or 100 MHz) of the unlicensed band can reduce implementation complexity of a base station and UE. The unlicensed band is shared by a plurality of radio access technologies (RATs), for example, wireless fidelity (Wi-Fi), radar, and long term evolution licensed-assisted access (LTE-LAA). Therefore, in some countries or regions, the unlicensed band must comply with rules during usage to ensure that all devices can fairly use the resource, for example, comply with rules such as Listen Before Talk (LBT) and maximum channel occupancy time (MCOT).

It should be noted that, the embodiments of this application and characteristics in the embodiments may be combined with each other provided that there is no conflict. The following describes the embodiments in detail with reference to the accompanying drawings.

FIG. 1 is a schematic flowchart of a method 100 for beam management in an unlicensed band according to some embodiments of the present disclosure. The method includes the following steps: step S110 to step S130.

Step S110: Receive a reference signal resource from a network device.

The reference signal resource may be received from the network device, and the reference signal resource may be a synchronous signal block (SSB) resource or a channel state information reference signal (CSI-RS) resource.

Step S120: Measure the reference signal resource in an unlicensed band, to obtain a beam measurement result.

Each time a reference signal resource is measured, a beam measurement result of the reference signal resource is obtained. The beam measurement result obtained by measuring in the unlicensed band may include: a reference signal resource index and layer 1 (L1)-reference signal received power (RSRP). In an embodiment, the beam measurement result obtained by measuring in the unlicensed band may include: a reference signal resource index and a block error rate (BLER) thereof.

Step S130: Send, by using an uplink resource for transmitting a beam report, the beam report including the beam measurement result.

The uplink resource for transmitting the beam report includes, but is not limited to: a physical uplink control channel (PUCCH) and/or a physical uplink shared channel (PUSCH). The beam report may include measurement results of one or more reference signal resources. For example, the beam report includes a measurement result of an optimal reference signal resource.

When the beam report includes a plurality of beam measurement results, reporting may be performed in a differential manner, that is, a maximum L1-RSRP measurement value or quantized value of the measurement results is used as a reference value, and other L1-RSRP of the measurement results are quantized in a differential manner. A difference from the reference value is calculated first, and then the difference is quantized.

Step S110 to step S130 may be performed by a terminal device. The terminal device may be a mobile phone, a tablet computer, a notebook computer, a palmtop computer, a mobile Internet device (MID), a wearable device, a desktop computer, and the like. The wearable device includes, but is not limited to, a smartwatch, a smart band, a pedometer, and the like. For example, the smartwatch is an iWatch.

Therefore, in the method for beam management in an unlicensed band in the embodiments of the present disclosure, the reference signal resource is measured in the unlicensed band to obtain the beam measurement result, and the beam report including the beam measurement result is sent. In this way, beam management can be performed in the unlicensed band, and therefore the beam measurement result can be effectively used to perform beam indication in the unlicensed band, to transmit data in the unlicensed band according to beam indication. In this way, a resource in the unlicensed band is effectively used and resource utilization is improved.

In an embodiment, the received reference signal resource is a plurality of reference signal resources, and step S130 includes:

after measuring the plurality of reference signal resources, sending the beam report including beam measurement results of the plurality of reference signal resources.

It should be noted that "a plurality of" refers to two or more.

After the plurality of reference signal resources are measured, the beam report including all the beam measurement results of the plurality of reference signal resources may be sent.

In an embodiment, after the plurality of reference signal resources are measured, the beam report including one optimal beam measurement result or several optimal beam measurement results may be sent.

In an embodiment, when the plurality of reference signal resources belongs to one reference signal resource set, the plurality of reference signal resources are some or all reference signal resources in the reference signal resource set.

For example, one reference signal resource set includes 64 reference signal resources, and the plurality of reference signal resources are the 64 reference signal resources of the reference signal resource set.

For another example, one reference signal resource set includes 64 reference signal resources, and the plurality of reference signal resources are a preset quantity of reference signal resources of the 64 reference signal resources of the reference signal resource set.

For still another example, one reference signal resource set includes 64 reference signal resources, the 64 reference signal resources are divided into four groups, each group includes 16 reference signal resources, and the plurality of reference signal resources are one or more groups of reference signal resources of the reference signal resource set.

In an embodiment, one reference signal resource set includes 4 reference signal resource subsets, and each reference signal resource subset includes 16 reference signal resources. The plurality of reference signal resources are all reference signal resources in one or more reference signal subsets of the reference signal resource set.

In this embodiment of the present disclosure, if the plurality of reference signal resources are some reference signal resources in a reference signal resource set, compared with sending the beam report after measuring all reference signal resources in a reference signal resource set, the beam report can be sent earlier after measuring some reference signal resources in a reference signal resource set, thereby accelerating a beam management process. In addition, the beam report can be used as early as possible to perform beam indication, and therefore data scheduling can be performed by using the beam indication as early as possible, thereby accelerating a data scheduling process, and effectively increasing a data transmission volume in the unlicensed band.

In an embodiment, when the plurality of reference signal resources belong to a plurality of reference signal resource sets, N reference signal resources of the plurality of reference signal resources are all reference signal resources in a first reference signal resource set of the plurality of reference signal resource sets, where N is a positive integer.

For example, all reference signal resources in a reference signal resource set A, all reference signal resources in a reference signal resource set B, and all reference signal resources in a reference signal resource set C form the plurality of reference signal resources.

In an embodiment, when the plurality of reference signal resources belong to a plurality of reference signal resource sets, M reference signal resources of the plurality of reference signal resources are some reference signal resources in a second reference signal resource set of the plurality of reference signal resource sets, where M is a positive integer.

For example, the reference signal resource set A, the reference signal resource set B, and the reference signal resource set C each have 64 reference signal resources, and the 64 reference signal resources are divided into 4 groups. A group of reference signal resources in the reference signal resource set A, a group of reference signal resources in the reference signal resource set B, and a group of reference signal resources in the reference signal resource set C form the plurality of reference signal resources.

In an embodiment, step S130 includes: sending the beam report after measuring the plurality of reference signal resources according to configuration information from the network device, indication information from the network device, or stipulation in a protocol.

It should be noted that, the network device may send configuration information related to the beam report to the terminal device by using high-layer signaling, and the terminal device sends the beam report after measuring the plurality of reference signal resources according to the configuration information.

In an embodiment, the network device sends indication information related to the beam report to the terminal device by using physical layer signaling, and the terminal device sends the beam report after measuring the plurality of reference signal resources according to the indication information.

In an embodiment, the beam report is sent after the plurality of reference signal resources are measured according to stipulation in a protocol.

The terminal device sends the beam report after measuring the plurality of reference signal resources in the foregoing three manners, instead of sending the beam report after measuring one reference signal resource.

In an embodiment, the reference signal resource in step S110 is one reference signal resource, and step S130 includes:
sending the beam report after measuring the reference signal resource.

In this embodiment of the present disclosure, each time a reference signal resource is measured, the beam report is sent, to ensure that the beam report can be sent as early as possible, thereby accelerating a beam management process. In addition, the beam report can be used as early as possible to perform beam indication, and therefore data scheduling can be performed by using the beam indication as early as possible, thereby accelerating a data scheduling process, and effectively increasing a data transmission volume in the unlicensed band.

In an embodiment, before step S130, the method 100 for beam management in an unlicensed band further includes:
a beam measurement result of the reference signal resource satisfying a preset condition.

It should be noted that, the preset condition includes, but is not limited to: L1-RSRP is greater than a first threshold configured by a network, indicated by a network, or agreed on in advance; and/or a signal-to-noise ratio is greater than a second threshold configured by a network, indicated by a network, or agreed on in advance.

In an embodiment, step S130 includes: sending the beam report after measuring the reference signal resource according to configuration information from the network device, indication information from the network device, or stipulation in a protocol.

It should be noted that, the network device may send configuration information related to the beam report to the terminal device by using high-layer signaling, and the terminal device sends the beam report after measuring one reference signal resource according to the configuration information.

In an embodiment, the network device sends indication information related to the beam report to the terminal device by using physical layer signaling, and the terminal device sends the beam report after measuring one reference signal resource according to the indication information.

In an embodiment, the beam report is sent after one reference signal resource is measured according to stipulation in a protocol.

The terminal device sends the beam report after measuring one reference signal resource in the foregoing three manners, instead of sending the beam report after measuring a plurality of reference signal resources.

In an embodiment, the method 100 for beam management in an unlicensed band further includes:
if a first reference signal resource is not received, sending, by using the uplink resource for transmitting the beam report, the beam report including a beam measurement result of the first reference signal resource.

It should be noted that, before the terminal device receives the first reference signal resource from the network device, because a measurement result obtained by the network device by performing LBT in a direction for sending the first reference signal resource is that a channel is occupied, the network device does not send the first reference signal resource, that is, the terminal device cannot receive the first reference signal resource. In this case, the first reference signal resource cannot be measured, and the beam report including the beam measurement result of the first reference signal resource may be sent.

In an embodiment, the method 100 for beam management in an unlicensed band further includes:
If the first reference signal resource is not received, selecting one or more optional beam measurement results as the beam report from a beam measurement result of a received reference signal resource and the beam measurement result of the first reference signal resource; and sending the beam report by using the uplink resource for transmitting the beam report.

In an embodiment, the beam measurement result of the first reference signal resource is a previously measured beam measurement result of the first reference signal resource; or the beam measurement result of the first reference signal resource is a most recently measured beam measurement result of a second reference signal resource; or the beam measurement result of the first reference signal resource is a preset beam measurement result. The preset beam measurement result may include L1-RSRP, for example, it is preset that the L1-RSRP is a value in a range of −40 decibel milliwatts (dBm) to −140 decibel milliwatts (dBm).

In an embodiment, the method 100 for beam management in an unlicensed band further includes:
if the first reference signal resource is not received, reporting that the first reference signal resource is not measured.

It should be noted that, if the first reference signal resource is not received, that the first reference signal resource is not measured may be reported or may not be reported. Because the first reference signal resource cannot be measured, the beam report does not include the beam measurement result of the first reference signal resource, and the beam report includes beam measurement results of one or more received reference signal resources.

In an embodiment, reporting that the first reference signal resource is not measured includes:
reporting, by using a status of a signaling field of the uplink resource, that the first reference signal resource is not measured.

It should be noted that, the signaling field of the uplink resource may be one or more of a plurality of signaling fields of the uplink resource. For example, the signaling field of the uplink resource may be a signaling field of the uplink resource for transmitting the beam report.

The status of the signaling field of the uplink resource may be set to a status used to indicate that the first reference signal resource is not measured. The status of the signaling field of the uplink resource may be predefined. For example, it is predefined that when the status of the signaling field of the uplink resource is 0000, it indicates that the first reference signal resource is not measured. In an embodiment, the status of the signaling field of the uplink resource may be reserved. For example, four statuses of the signaling field of the uplink resource are: 0000 to 0011 that are not used. The status of 0000 may be reserved to indicate that the first reference signal resource is not measured.

Figure 2:
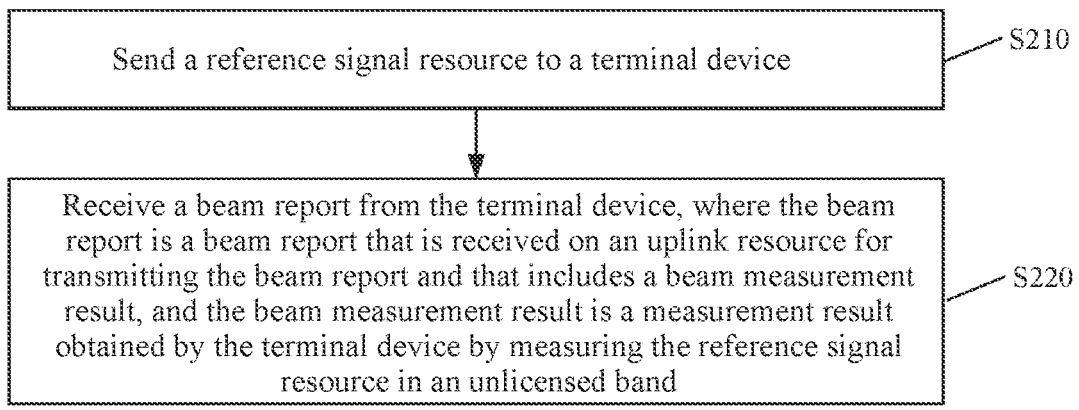
FIG. 2 is a schematic flowchart of a method for beam management in an unlicensed band according to some other embodiments of the present disclosure.

FIG. 2 is a schematic flowchart of a method 200 for beam management in an unlicensed band according to some other embodiments of the present disclosure. The method includes the following steps: step S210 and step S220.

Step 210: Send a reference signal resource to a terminal device.

The reference signal resource may be an SSB resource or a CSI-RS resource. The reference signal resource may be sent to the terminal device, so that the terminal device performs beam measurement by using the reference signal resource.

Step S220: Receive a beam report from the terminal device, where the beam report is a beam report that is received on an uplink resource for transmitting the beam report and that includes a beam measurement result, and the beam measurement result is a measurement result obtained by the terminal device by measuring the reference signal resource in an unlicensed band.

Step S210 and step S220 may be performed by a network device. For example, the network device may be a base station, for example, an evolved base station (Evolved Node Base station, eNB). In 5G, the network device may be a base station applicable to NR, for example, a next-generation base station (next generation Node Base station, gNB). In a communications system of another technology, the network device may have another name. Examples are not listed herein one by one again.

Therefore, in the method for beam management in an unlicensed band in this embodiment of the present disclosure, the reference signal resource is sent and the beam report is received, where the beam report includes the beam measurement result obtained by measuring the reference signal resource in the unlicensed band. In this way, beam management can be performed in the unlicensed band, and therefore the beam report can be effectively used to perform beam indication in the unlicensed band, to transmit data in the unlicensed band according to beam indication. In this way, a resource in the unlicensed band is effectively used and resource utilization is improved.

In an embodiment, the reference signal resource in step S210 is a plurality of reference signal resources, and the beam report is a received beam report sent by the terminal device after the terminal device measures the plurality of reference signal resources.

In an embodiment, when the plurality of reference signal resources belong to one reference signal resource set, the plurality of reference signal resources are some or all reference signal resources in the reference signal resource set.

In an embodiment, when the plurality of reference signal resources belong to a plurality of reference signal resource sets, N reference signal resources of the plurality of reference signal resources are all reference signal resources in a reference signal resource set of the plurality of reference signal resource sets, where N is a positive integer.

In an embodiment, when the plurality of reference signal resources belong to a plurality of reference signal resource sets, M reference signal resources of the plurality of reference signal resources are some reference signal resources in a reference signal resource set of the plurality of reference signal resource sets, where M is a positive integer.

In the embodiment corresponding to FIG. 1 in the present invention, that the plurality of reference signal resources belong to one or more reference signal resource sets is already described in detail. Details are not described herein again.

In an embodiment, the reference signal resource in step S210 is one reference signal resource, and the beam report is a received beam report sent by the terminal device after the terminal device measures one reference signal resource.

In an implementation, step S210 includes:

for each to-be-sent reference signal resource of the received reference signal resource, performing LBT in a direction of the to-be-sent reference signal resource by using a receiving beam, where a width of the receiving beam is greater than or equal to a width of a transmitting beam used by the to-be-sent reference signal resource; and if a measurement result of the LBT is that a channel is idle, sending the to-be-sent reference signal resource to the terminal device in the direction of the to-be-sent reference signal resource.

It should be noted that, if the measurement result of the LBT is that a channel is occupied, the to-be-sent reference signal resource cannot be sent in the direction of the to-be-sent reference signal resource.

In an embodiment, after step S220, the method 200 for beam management in an unlicensed band further includes:

stopping performing LBT in a direction of a reference signal resource that is not sent, and stopping sending the reference signal resource that is not sent.

In this embodiment of the present disclosure, after step S220, LBT may be stopped in the direction of the reference signal resource that is not sent, and sending of the reference signal resource that is not sent may be stopped. Because data scheduling and beam indication may be performed after the beam report is received, LBT and beam management do not need to continue to be performed, thereby reducing a quantity of times LBT is performed in beam management, reducing overheads of LBT in beam management, and improving resource utilization.

In an embodiment, after step S220, LBT may continue to be performed in the direction of the reference signal resource that is not sent, to continue to send the reference signal resource that is not sent.

In an embodiment, after step S220, the method 200 for beam management in an unlicensed band further includes:

If the beam report does not include the measurement result of the first reference signal resource, skipping using the beam measurement result of the first reference signal resource to perform beam indication; or if the beam report does not include the measurement result of the first reference signal resource, using the beam measurement result of the first reference signal resource in a previously received beam report as a current beam measurement result of the first reference signal resource; or if the beam report does not include the measurement result of the first reference signal resource, using a beam measurement result of a second reference signal resource as a current beam measurement result of the first reference signal resource, wherein the second reference signal resource is used in latest beam measurement and the transmit beam of the second reference signal is the same as that of the first reference signal resource.

It should be noted that, after the plurality of reference signal resources are sent, the beam report may include one optimal beam measurement result or several optimal beam measurement results, that is, the beam report does not include beam measurement results of all sent reference signal resources. In an embodiment, since the reference signal resource is not sent because a channel is occupied, the beam report may not include a beam measurement result of the reference signal resource that is not sent. In an embodiment, after a reference signal resource is sent, a beam measurement result of the reference signal resource does not satisfy a preset condition, and the beam report does not include the beam measurement result of the reference signal resource.

In an embodiment, after step S220, the method 200 for beam management in an unlicensed band further includes:
determining beam indication information according to the beam report recently received for M times, where M is 1 or a positive integer greater than 1.

For example, a first beam report is first received, and the beam indication information is determined according to the first beam report. Then, a second beam report is received, and the beam indication information may be determined according to the second beam report, or the beam indication information may be determined according to an optimal beam measurement result of the first beam report and the second beam report.

In an embodiment, the method for beam management in an unlicensed band further includes: sending the configuration information or the indication information to the terminal device.

The configuration information or the indication information is used to instruct the terminal device to send the beam report after measuring one reference signal resource; or the configuration information or the indication information is used to instruct the terminal device to send the beam report after measuring a plurality of reference signal resources.

In an embodiment, before step 210, the method for beam management in an unlicensed band further includes: configuring, indicating, or agreeing on in advance the reference signal resource that is used to instruct the terminal device to perform beam measurement.

It should be noted that, in configuration of the reference signal resource, a report quantity may be configured as "CSI-RS resource indicator (CRI)/RSRP" or "SSB resource indicator (SSBRI)/RSRP". Configuring the report quantity for the terminal device indicates that the terminal device can obtain L1-RSRP of each beam by using the configured reference signal resource, and report the L1-RSRP to a gNB.

In an embodiment, the method for beam management in an unlicensed band further includes: configuring, indicating, or agreeing on in advance the uplink resource for transmitting the beam report, content information of the beam report, a time domain-related message of the beam report, frequency domain granularity (frequency granularity) information of the beam report, and the like. The time domain-related message of the beam report includes, but is not limited to: periodic, aperiodic, and semi-persistent. The uplink resource for transmitting the beam report includes, but is not limited to: a PUCCH and/or a PUSCH.

Figure 3:
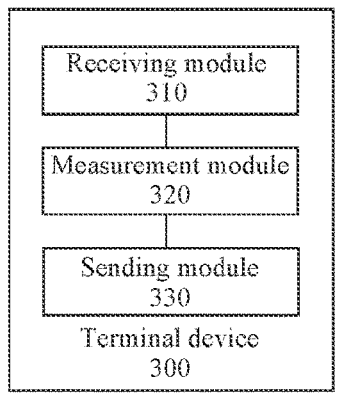
FIG. 3 is a schematic block diagram of a terminal device according to some embodiments of the present disclosure.

FIG. 3 is a schematic structural diagram of a terminal device 300 according to some embodiments of the present disclosure. The terminal device 300 includes: a receiving module 310, a measurement module 320, and a sending module 330.

The receiving module 310 is configured to receive a reference signal resource from a network device.

The measurement module 320 is configured to measure the reference signal resource in an unlicensed band, to obtain a beam measurement result.

The sending module 330 is configured to send, by using an uplink resource for transmitting a beam report, the beam report including the beam measurement result.

In an embodiment, the reference signal resource is a plurality of reference signal resources, and the sending module 330 is configured to:
send the beam report after the measurement module 320 measures the plurality of reference signal resources.

In an embodiment, when the plurality of reference signal resources belong to one reference signal resource set, the plurality of reference signal resources are some or all reference signal resources in the reference signal resource set.

When the plurality of reference signal resources belong to a plurality of reference signal resource sets, N reference signal resources of the plurality of reference signal resources are all reference signal resources in a first reference signal resource set of the plurality of reference signal resource sets, where N is a positive integer.

When the plurality of reference signal resources belong to a plurality of reference signal resource sets, M reference signal resources of the plurality of reference signal resources are some reference signal resources in a second reference signal resource set of the plurality of reference signal resource sets, where M is a positive integer.

In an embodiment, the sending module 330 is configured to:
send the beam report after the measurement module 320 measures the plurality of reference signal resources according to configuration information from the network device, indication information from the network device, or stipulation in a protocol.

In an embodiment, the reference signal resource is one reference signal resource, and the sending module 330 is configured to:
send the beam report after the measurement module 320 measures one reference signal resource.

In an embodiment, a beam measurement result of the reference signal resource satisfies a preset condition.

In an embodiment, the sending module 330 is configured to:
send the beam report after the measurement module 320 measures one reference signal resource according to configuration information from the network device, indication information from the network device, or stipulation in a protocol.

In an embodiment, the sending module 330 is further configured to:
if the receiving module 310 has not received a first reference signal resource, send, by using the uplink resource for transmitting the beam report, the beam report including a beam measurement result of the first reference signal resource.

In an embodiment, the beam measurement result of the first reference signal resource is a previously measured beam measurement result of the first reference signal resource; or the beam measurement result of the first reference signal resource is a most recently measured beam measurement result of a second reference signal resource; or the beam measurement result of the first reference signal resource is a preset beam measurement result.

In an embodiment, the terminal device 300 further includes:
a reporting module, configured to: if the receiving module 310 has not received the first reference signal resource, report that the first reference signal resource is not measured.

In an embodiment, the reporting module is configured to:
report, by using a status of a signaling field of the uplink resource, that the first reference signal resource is not measured.

Figure 4:
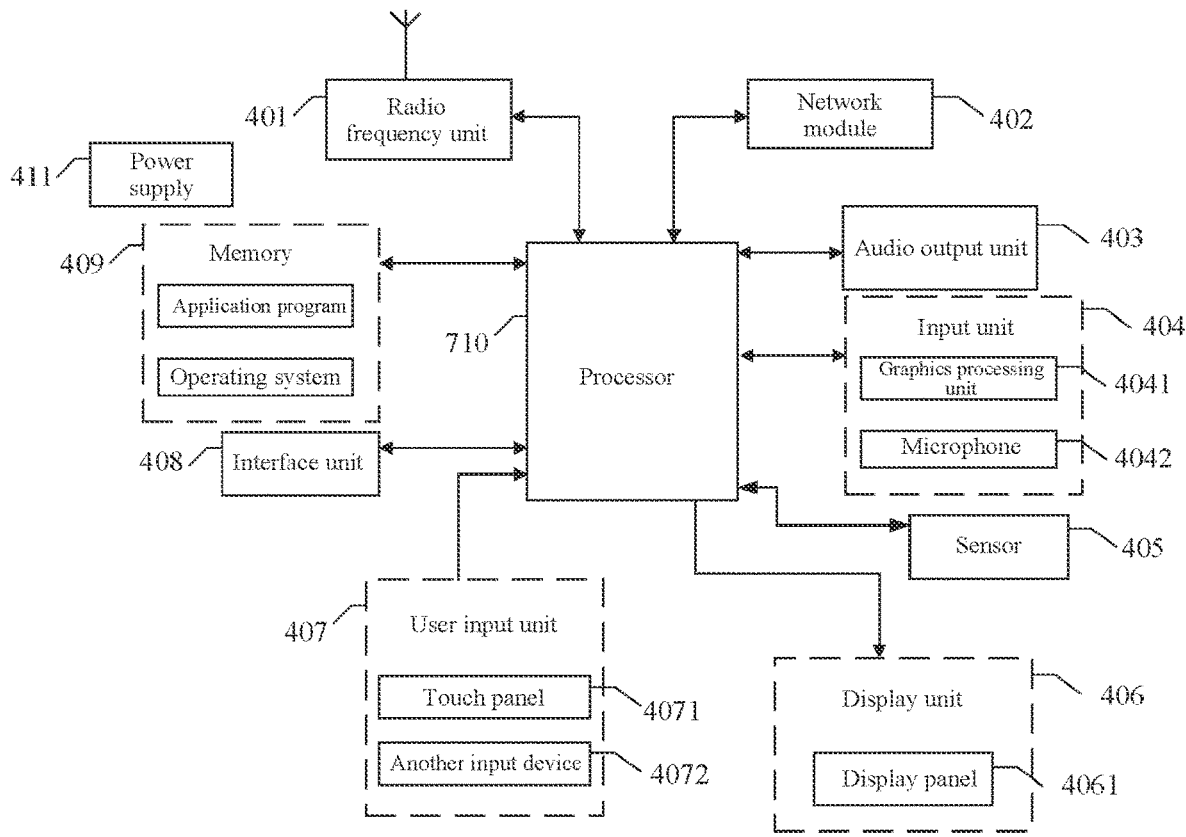
FIG. 4 is a schematic block diagram of a terminal device according to some other embodiments of the present disclosure.

FIG. 4 is a schematic structural diagram of a terminal device 400 according to some other embodiments of the present disclosure. The terminal device 400 includes, but is not limited to: components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the structure of the terminal device shown in FIG. 4 does not constitute a limitation on the terminal device. The terminal device may include more or fewer components than those shown in the figure, or some components are combined, or a different component arrangement is used. In this embodiment of the present disclosure, the terminal device includes, but is not limited to, a mobile phone, a tablet computer, a notebook computer, a palmtop computer, a vehicle-mounted terminal, a wearable device, a pedometer, or the like.

The processor 410 is configured to:
receive a reference signal resource from a network device;
measure the reference signal resource in an unlicensed band, to obtain a beam measurement result; and
send, by using an uplink resource for transmitting a beam report, the beam report including the beam measurement result.

The reference signal resource is a plurality of reference signal resources, and the processor 410 is configured to:
send the beam report after measuring the plurality of reference signal resources.

When the plurality of reference signal resources belong to one reference signal resource set, the plurality of reference signal resources are some or all reference signal resources in the reference signal resource set;
when the plurality of reference signal resources belong to a plurality of reference signal resource sets, N reference signal resources of the plurality of reference signal resources are all reference signal resources in a first reference signal resource set of the plurality of reference signal resource sets, where N is a positive integer; and
when the plurality of reference signal resources belong to a plurality of reference signal resource sets, M reference signal resources of the plurality of reference signal resources are some reference signal resources in a second reference signal resource set of the plurality of reference signal resource sets, where M is a positive integer.

The processor 410 is configured to:
send the beam report after measuring the plurality of reference signal resources according to configuration information from the network device, indication information from the network device, or stipulation in a protocol.

The reference signal resource is one reference signal resource, and the processor 410 is configured to:
send the beam report after measuring the reference signal resource.

A beam measurement result of the reference signal resource satisfies a preset condition.

The processor 410 is configured to:
send the beam report after measuring the reference signal resource according to configuration information from the network device, indication information from the network device, or stipulation in a protocol.

The processor 410 is further configured to:
if a first reference signal resource is not received, send, by using the uplink resource for transmitting the beam report, the beam report including a beam measurement result of the first reference signal resource.

The beam measurement result of the first reference signal resource is a previously measured beam measurement result of the first reference signal resource; or the beam measurement result of the first reference signal resource is a most recently measured beam measurement result of a second reference signal resource; or the beam measurement result of the first reference signal resource is a preset beam measurement result.

The processor 410 is further configured to:
if the first reference signal resource is not received, report that the first reference signal resource is not measured.

The processor 410 is configured to:
report, by using a status of a signaling field of the uplink resource, that the first reference signal resource is not measured.

It should be understood that in this embodiment of the present disclosure, the radio frequency unit 401 may be configured to receive and send a signal in a process of receiving and sending information or calling. Specifically, the radio frequency unit 401 receives downlink data from a base station for processing by the processor 410, and sends uplink data to the base station. Generally, the radio frequency unit 401 includes, but is not limited to, an antenna, at least one amplifier, a transceiver, a coupler, a low noise amplifier, a duplexer, and the like. In addition, the radio frequency unit 401 can also communicate with another device through a wireless communications system and a network.

The terminal device provides a user with wireless broadband Internet access through the network module 402, for example, helps the user send and receive emails, browse web pages, and access streaming media.

The audio output unit 403 can convert audio data received by the radio frequency unit 401 or the network module 402 or stored in the memory 409 into an audio signal, and output the audio signal as sound. In addition, the audio output unit 403 can also provide audio output related to a specific function performed by the terminal device (for example, call signal receiving sound or message receiving sound). The audio output unit 403 includes a speaker, a buzzer, a telephone receiver, and the like.

The input unit 404 is configured to receive an audio signal or a video signal. The input unit 404 can include a graphics processing unit (GPU) 4041 and a microphone 4042. The graphics processing unit 4041 processes image data of a static picture or a video captured by an image capturing apparatus (for example, a camera) in a video capturing mode or an image capturing mode. A processed image frame can be displayed on the display unit 406. The image frame processed by the graphics processing unit 4041 can be stored in the memory 409 (or another computer readable storage medium) or sent via the radio frequency unit 401 or the network module 402. The microphone 4042 can receive sound and can process such sound into audio data. The processed audio data may be converted in a telephone call mode into a format that can be sent by the radio frequency unit 401 to a mobile communications base station for output.

The terminal device further includes at least one sensor 405, such as a light sensor, a motion sensor, and other sensors. Specifically, the light sensor includes an ambient light sensor and a proximity sensor. The ambient light sensor can adjust a brightness of a display panel 4061 based on brightness of ambient light. The proximity sensor can turn off the display panel 4061 and/or backlight when the terminal device moves to an ear. As a type of motion sensor, an accelerometer sensor may detect an acceleration in each direction (generally, three axes), detect a value and a direction of gravity when the accelerometer sensor is static, and may be configured to recognize a terminal device posture (such as switching between a landscape mode and a portrait mode, a related game, or magnetometer posture calibration), and perform a function related to vibration recognition (such as, a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein again.

The display unit 406 is configured to display information input by a user or information provided to a user. The display unit 406 may include the display panel 4061, and the display panel 4061 may be configured in a form of a liquid crystal display (LCD), an organic light-emitting diode (OLED), or the like.

The user input unit 407 may be configured to receive entered digit or character information and generate a key signal input related to user setting and function control of the terminal device. Specifically, the user input unit 407 includes a touch panel 4041 and another input device 4072. The touch panel 4041 is also referred to as a touchscreen, and may collect a touch operation performed by the user on or near the touch panel 4041 (such as an operation performed by the user on or near the touch panel 4041 by using any proper object or accessory such as a finger or a stylus). The touch panel 4041 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into contact coordinates, sends the contact coordinates to the processor 410, and receives and executes a command sent by the processor 410. In addition, the touch panel 4041 can be implemented by using a plurality of types such as a resistance type, a capacitance type, an infrared type, and a surface acoustic wave type. In addition to the touch panel 4041, the user input unit 407 may further include the another input device 4072. Specifically, the another input device 4072 may include, but is not limited to, a physical keyboard, function keys (such as a volume control key and a switch key), a trackball, a mouse, and a joystick. Details are not described herein again.

Further, the touch panel 4041 can cover the display panel 4061. When detecting a touch operation on or near the touch panel 4041, the touch panel 4041 transmits the touch operation to the processor 410 to determine a type of a touch event. Then the processor 410 provides a corresponding visual output on the display panel 4061 based on the type of the touch event. Although in FIG. 4, the touch panel 4041 and the display panel 4061 serve as two independent components to implement input and output functions of the terminal device, in some embodiments, the touch panel 4041 and the display panel 4061 can be integrated to implement the input and output functions of the terminal device. Details are not limited herein.

The interface unit 408 is an interface connecting an external apparatus to the terminal device. For example, the external apparatus can include a wired or wireless headphone port, an external power supply (or a battery charger) port, a wired or wireless data port, a memory card port, a port for connection with an apparatus having an identification module, an audio input/output (I/O) port, a video I/O port, an earphone port, and the like. The interface unit 408 may be configured to receive an input (for example, data information and power) from an external apparatus and transmit a received input to one or more elements within the terminal device, or may be configured to transmit data between the terminal device and the external apparatus.

The memory 409 may be configured to store a software program and various data. The memory 409 may mainly include a program storage area and a data storage area. The program storage area may store an operating system, an application program required by at least one function (such as a sound playback function and an image display function), and the like. The data storage area may store data (such as audio data and a phone book) created based on use of the mobile phone, and the like. In addition, the memory 409 may include a high-speed random access memory or a nonvolatile memory, for example, at least one magnetic disk storage device, a flash memory device, or another volatile solid-state storage device.

The processor 410 is a control center of the terminal. The processor 410 uses various interfaces and lines to connect various parts of the entire terminal device, and performs various functions of the terminal device and processes data by running or executing the software program and/or a module stored in the memory 409 and invoking data stored in the memory 409, to monitor the terminal device as a whole. The processor 410 may include one or more processing units. In an embodiment, the processor 410 may integrate an application processor and a modem processor. The application processor mainly deals with an operating system, a user interface, an application program, and the like. The modem processor mainly deals with wireless communication. It may be understood that the modem processor may alternatively not be integrated into the processor 410.

The terminal device may further include a power supply 411 (for example, a battery) that supplies power to various components. In an embodiment, the power supply 411 may be logically connected to the processor 410 through a power supply management system, to perform functions of managing charging, discharging, and power consumption through the power supply management system.

In addition, the terminal device includes some functional modules not shown. Details are not described herein again.

An embodiment of the present disclosure further provides a terminal device, including the processor 410, the memory 409, and a computer program stored in the memory 409 and executable on the processor 410, where when the computer program is executed by the processor 410, the processes of the method for beam management in an unlicensed band that corresponds to FIG. 1 are performed, and the same technical effects can be achieved. To avoid repetition, details are not described herein again.

An embodiment of the present disclosure provides a computer readable storage medium, where the computer readable storage medium stores a computer program, and when the computer program is executed by a processor, the processes of the method for beam management in an unlicensed band that corresponds to FIG. 1 are performed, and the same technical effects can be achieved. To avoid repetition, details are not described herein again. The computer readable storage medium is, for example, a read-only memory (ROM), a random access memory (RAM), a magnetic disk, or an optical disc.

Figure 5:
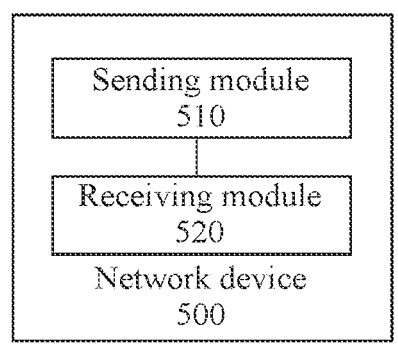
FIG. 5 is a schematic block diagram of a network device according to some embodiments of the present disclosure.

FIG. 5 is a schematic structural diagram of a network device 500 according to some embodiments of the present disclosure. The network device 500 includes: a sending module 510 and a receiving module 520.

The sending module 510 is configured to send a reference signal resource to a terminal device.

The receiving module 520 is configured to receive a beam report from the terminal device, where the beam report is a beam report that is received on an uplink resource for transmitting the beam report and that includes a beam measurement result, and the beam measurement result is a measurement result obtained by the terminal device by measuring the reference signal resource in an unlicensed band.

In an embodiment, the reference signal resource is a plurality of reference signal resources, and the beam report is a received beam report sent by the terminal device after the terminal device measures the plurality of reference signal resources.

In an embodiment, when the plurality of reference signal resources belong to one reference signal resource set, the plurality of reference signal resources are some or all reference signal resources in the reference signal resource set;

when the plurality of reference signal resources belong to a plurality of reference signal resource sets, N reference signal resources of the plurality of reference signal resources are all reference signal resources in a reference signal resource set of the plurality of reference signal resource sets, where N is a positive integer; and when the plurality of reference signal resources belong to a plurality of reference signal resource sets, M reference signal resources of the plurality of reference signal resources are some reference signal resources in a reference signal resource set of the plurality of reference signal resource sets, where M is a positive integer.

In an embodiment, the reference signal resource is one reference signal resource, and the beam report is a received beam report sent by the terminal device after the terminal device measures one reference signal resource.

In an embodiment, the sending module 510 includes:

an LBT unit, configured to: for each to-be-sent reference signal resource of the reference signal resource, perform LBT in a direction of the to-be-sent reference signal resource by using a receiving beam, where a width of the receiving beam is greater than or equal to a width of a transmitting beam used by the to-be-sent reference signal resource; and a sending unit, configured to: if a measurement result of the LBT unit is that a channel is idle, send the to-be-sent reference signal resource to the terminal device in the direction of the to-be-sent reference signal resource.

In an embodiment, the network device 500 further includes:

an execution stopping module, configured to stop performing LBT in a direction of a reference signal resource that is not sent, and stop sending the reference signal resource that is not sent.

In an embodiment, the network device 500 further includes:

a processing unit, configured to: if the beam report does not include the measurement result of the first reference signal resource, skip using the beam measurement result of the first reference signal resource to perform beam indication; or a processing unit, configured to: if the beam report does not include the measurement result of the first reference signal resource, using the beam measurement result of the first reference signal resource in a previously received beam report as a current beam measurement result of the first reference signal resource; or a processing unit, configured to: if the beam report does not include the measurement result of the first reference signal resource, using a beam measurement result of a second reference signal resource as a current beam measurement result of the first reference signal resource, wherein the second reference signal resource is used in latest beam measurement and the transmit beam of the second reference signal is the same as that of the first reference signal resource;

In an embodiment, the network device 500 further includes:

a determining module, configured to determine beam indication information according to the beam report recently received for M times, where M is 1 or a positive integer greater than 1.

Figure 6:
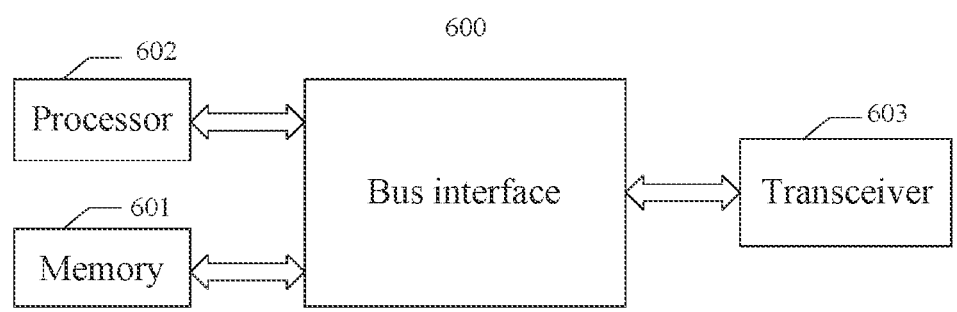
FIG. 6 is a schematic block diagram of a network device according to some other embodiments of the present disclosure.

FIG. 6 is a schematic structural diagram of a network device 600 according to some embodiments of the present disclosure. The network device 600 includes: a memory 601, a processor 602, a transceiver 603, and a program stored in the memory 601 and executable on the processor 602.

The processor 602 is configured to:

send a reference signal resource to a terminal device; and receive a beam report from the terminal device, where the beam report is a beam report that is received on an uplink resource for transmitting the beam report and that includes a beam measurement result, and the beam measurement result is a measurement result obtained by the terminal device by measuring the reference signal resource in an unlicensed band.

The reference signal resource is a plurality of reference signal resources, and the beam report is a received beam report sent by the terminal device after the terminal device measures the plurality of reference signal resources.

When the plurality of reference signal resources belong to one reference signal resource set, the plurality of reference signal resources are some or all reference signal resources in the reference signal resource set;

when the plurality of reference signal resources belong to a plurality of reference signal resource sets, N reference signal resources of the plurality of reference signal resources are all reference signal resources in a reference signal resource set of the plurality of reference signal resource sets, where N is a positive integer; and when the plurality of reference signal resources belong to a plurality of reference signal resource sets, M reference signal resources of the plurality of reference signal resources are some reference signal resources in a reference signal resource set of the plurality of reference signal resource sets, where M is a positive integer.

The reference signal resource is one reference signal resource, and the beam report is a received beam report sent by the terminal device after the terminal device measures one reference signal resource.

The processor 602 is configured to:

for each to-be-sent reference signal resource of the reference signal resource, perform LBT in a direction of the to-be-sent reference signal resource by using a receiving beam, where a width of the receiving beam is greater than or equal to a width of a transmitting beam used by the to-be-sent reference signal resource; and if a measurement result of the LBT is that a channel is idle, send the to-be-sent reference signal resource in the direction of the to-be-sent reference signal resource.

The processor 602 is further configured to:

stopping performing LBT in a direction of a reference signal resource that is not sent, and stopping sending the reference signal resource that is not sent.

The processor 602 is further configured to:

if the beam report does not include the measurement result of the first reference signal resource, skipping using the beam measurement result of the first reference signal resource to perform beam indication; or if the beam report does not include the measurement result of the first reference signal resource, using the beam measurement result of the first reference signal resource in a previously received beam report as a current beam measurement result of the first reference signal resource; or if the beam report does not include the measurement result of the first reference signal resource, using a beam measurement result of a second reference signal resource as a current beam measurement result of the first reference signal resource, wherein the second reference signal resource is used in latest beam measurement and the transmit beam of the second reference signal is the same as that of the first reference signal resource.

The processor 602 is further configured to:

determine beam indication information according to the beam report recently received for M times, where M is 1 or a positive integer greater than 1.

In FIG. 6, a bus architecture may include any quantity of interconnected buses and bridges, which are specifically connected by various circuits of one or more processors represented by the processor 602 and a memory represented by the memory 601. The bus architecture may further connect various other circuits of a peripheral device, a voltage stabilizer, a power management circuit, and the like. These are all well known in the art and will not be further described again in this specification. The bus interface provides an interface. The transceiver 603 may include a plurality of elements, that is, include a transmitter and a receiver, provides units for communication with various other apparatuses on a transmission medium, and is configured to receive and send data under control of the processor 602. The processor 602 is responsible for management of the bus architecture and general processing. The memory 601 can store data used by the processor 602 during operation execution.

An embodiment of the present disclosure provides a computer readable storage medium, where the computer readable storage medium stores a computer program, and when the computer program is executed by a processor, the processes of the method for beam management in an unlicensed band that corresponds to FIG. 2 are performed, and the same technical effects can be achieved. To avoid repetition, details are not described herein again. The computer readable storage medium is, for example, a ROM, a random access RAM, a magnetic disk, or an optical disc.

The foregoing descriptions are merely specific implementations of the present disclosure, and the protection scope of the present disclosure is not limited thereto. Various equivalent modifications or replacements readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A network device, comprising:
   a processor; and
   a non-transitory memory coupled to the processor, the memory storing a program that, when executed by the processor, causes the processor to:
   send a reference signal resource to a terminal device; and
   receive a beam report from the terminal device, wherein the beam report is received on an uplink resource for transmitting the beam report and that comprises a beam measurement result, and the beam measurement result is a measurement result obtained by the terminal device by measuring the reference signal resource in an unlicensed band,
   wherein, when the reference signal resource comprises a plurality of reference signal resources in at least one reference signal set, the beam measurement result of the plurality of reference resources in the unlicensed band are received in the beam report collectively, or otherwise, the beam report comprising the beam measurement result of each reference signal resource in the unlicensed band is received individually.

2. The network device according to claim 1, wherein
   the reference signal resource comprises the plurality of reference signal resources, and the beam report is a received beam report sent by the terminal device after the terminal device measures the plurality of reference signal resources; or
   the beam report is a received beam report sent by the terminal device after the terminal device measures each one reference signal resource.

3. The network device according to claim 2, wherein
   when the plurality of reference signal resources belong to one reference signal resource set, the plurality of reference signal resources are some or all reference signal resources in the reference signal resource set;
   when the plurality of reference signal resources belong to a plurality of reference signal resource sets, N reference signal resources of the plurality of reference signal resources are all reference signal resources in a reference signal resource set of the plurality of reference signal resource sets, wherein N is a positive integer; and
   when the plurality of reference signal resources belong to the plurality of reference signal resource sets, M reference signal resources of the plurality of reference signal resources are some reference signal resources in a reference signal resource set of the plurality of reference signal resource sets, wherein M is a positive integer.

4. The network device according to claim 1, wherein to send a reference signal resource to a terminal device, the program further causes the processor to:
   for each to-be-sent reference signal resource of the reference signal resource, perform listen before talk (LBT) in a direction of the to-be-sent reference signal resource by using a receiving beam, wherein a width of the receiving beam is greater than or equal to a width of a transmitting beam used by the to-be-sent reference signal resource; and
   when a measurement result of the LBT is that a channel is idle, send the to-be-sent reference signal resource to the terminal device in the direction of the to-be-sent reference signal resource.

5. The network device according to claim 4, wherein after receiving the beam report from the terminal device, the program further causes the processor to:
   stop performing the LBT in a direction of a reference signal resource that is not sent, and stop sending the reference signal resource that is not sent.

6. The network device according to claim 1, wherein after receiving the beam report from the terminal device, the program further causes the processor to:

when the beam report does not comprise the measurement result of the first reference signal resource, skip using the beam measurement result of the first reference signal resource to perform beam indication; or when the beam report does not comprise the measurement result of the first reference signal resource, use the beam measurement result of the first reference signal resource in a previously received beam report as a current beam measurement result of the first reference signal resource; or when the beam report does not comprise the measurement result of the first reference signal resource, use a beam measurement result of a second reference signal resource as a current beam measurement result of the first reference signal resource, wherein the second reference signal resource is used in a latest beam measurement and a transmit beam of the second reference signal is the same as a transmit beam of the first reference signal resource.

7. The network device according to claim 1, wherein after receiving the beam report from the terminal device, the program further causes the processor to:
determine beam indication information according to the beam report recently received for M times, wherein M is 1 or a positive integer greater than 1.

8. A non-transitory computer-readable medium storing instructions that, when executed by a processor, cause the processor to perform operations comprising:
receiving a reference signal resource from a network device;
measuring the reference signal resource in an unlicensed band, to obtain a beam measurement result; and
sending, using an uplink resource for transmitting a beam report, the beam report comprising the beam measurement result,
wherein, when the reference signal resource comprises a plurality of reference signal resources in at least one reference signal set, the beam measurement result of the plurality of reference resources in the unlicensed band are sent in the beam report collectively, or otherwise, the beam report comprising the beam measurement result of each reference signal resource in the unlicensed band is sent individually.

9. The non-transitory computer-readable medium according to claim 8, wherein the reference signal resource comprises the plurality of reference signal resources, and sending the beam report comprising the beam measurement result comprises:
sending the beam report after measuring the plurality of reference signal resources.

10. The non-transitory computer-readable medium according to claim 9, wherein
when the plurality of reference signal resources belong to one reference signal resource set, the plurality of reference signal resources are some or all reference signal resources in the reference signal resource set;
when the plurality of reference signal resources belong to a plurality of reference signal resource sets, N reference signal resources of the plurality of reference signal resources are all reference signal resources in a first reference signal resource set of the plurality of reference signal resource sets, wherein N is a positive integer; and
when the plurality of reference signal resources belong to the plurality of reference signal resource sets, M reference signal resources of the plurality of reference signal resources are some reference signal resources in a second reference signal resource set of the plurality of reference signal resource sets, wherein M is a positive integer.

11. The non-transitory computer-readable medium according to claim 8, wherein sending the beam report comprising the beam measurement result comprises:
sending the beam report after measuring each one reference signal resource.

12. The non-transitory computer-readable medium according to claim 11, wherein the beam measurement result of the reference signal resource satisfies a preset condition before sending the beam report.

13. The non-transitory computer-readable medium according to claim 8, wherein the operations further comprise:
when a first reference signal resource is not received, reporting that the first reference signal resource is not measured, or sending using the uplink resource for transmitting the beam report, the beam report comprising the beam measurement result of the first reference signal resource, wherein
the beam measurement result of the first reference signal resource is a previously measured beam measurement result of the first reference signal resource; or
the beam measurement result of the first reference signal resource is a most recently measured beam measurement result of a second reference signal resource; or
the beam measurement result of the first reference signal resource is a preset beam measurement result.

14. The non-transitory computer-readable medium according to claim 13, wherein reporting that the first reference signal resource is not measured comprises:
reporting using a status of a signaling field of the uplink resource, that the first reference signal resource is not measured.

15. A non-transitory computer-readable medium storing instructions that, when executed by a processor, cause the processor to perform operations comprising:
sending a reference signal resource to a terminal device; and
receiving a beam report from the terminal device, wherein the beam report is received on an uplink resource for transmitting the beam report and that comprises a beam measurement result, and the beam measurement result is a measurement result obtained by the terminal device by measuring the reference signal resource in an unlicensed band,
wherein, when the reference signal resource comprises a plurality of reference signal resources in at least one reference signal set, the beam measurement result of the plurality of reference resources in the unlicensed band are received in the beam report collectively, or otherwise, the beam report comprising the beam measurement result of each reference signal resource in the unlicensed band is received individually.

16. The non-transitory computer-readable medium according to claim 15, wherein
the reference signal resource comprises the plurality of reference signal resources, and the beam report is a received beam report sent by the terminal device after the terminal device measures the plurality of reference signal resources; or
the beam report is a received beam report sent by the terminal device after the terminal device measures each one reference signal resource.

17. The non-transitory computer-readable medium according to claim 16, wherein when the plurality of reference signal resources belong to one reference signal resource set, the plurality of reference signal resources are some or all reference signal resources in the reference signal resource set;

when the plurality of reference signal resources belong to a plurality of reference signal resource sets, N reference signal resources of the plurality of reference signal resources are all reference signal resources in a reference signal resource set of the plurality of reference signal resource sets, wherein N is a positive integer; and when the plurality of reference signal resources belong to the plurality of reference signal resource sets, M reference signal resources of the plurality of reference signal resources are some reference signal resources in a reference signal resource set of the plurality of reference signal resource sets, wherein M is a positive integer.

18. The non-transitory computer-readable medium according to claim 15, wherein sending a reference signal resource to a terminal device comprises:

for each to-be-sent reference signal resource of the reference signal resource, performing listen before talk (LBT) in a direction of the to-be-sent reference signal resource by using a receiving beam, wherein a width of the receiving beam is greater than or equal to a width of a transmitting beam used by the to-be-sent reference signal resource; and when a measurement result of the LBT is that a channel is idle, sending the to-be-sent reference signal resource to the terminal device in the direction of the to-be-sent reference signal resource.

19. The non-transitory computer-readable medium according to claim 18, wherein after receiving the beam report from the terminal device, the operations further comprise:

stopping performing the LBT in a direction of a reference signal resource that is not sent, and stopping sending the reference signal resource that is not sent.

20. The non-transitory computer-readable medium according to claim 15, wherein after receiving the beam report from the terminal device, the operations further comprise:

when the beam report does not comprise the measurement result of the first reference signal resource, skipping using the beam measurement result of the first reference signal resource to perform beam indication;

when the beam report does not comprise the measurement result of the first reference signal resource, using the beam measurement result of the first reference signal resource in a previously received beam report as a current beam measurement result of the first reference signal resource;

when the beam report does not comprise the measurement result of the first reference signal resource, using a beam measurement result of a second reference signal resource as a current beam measurement result of the first reference signal resource, wherein the second reference signal resource is used in a latest beam measurement and a transmit beam of the second reference signal is the same as a transmit beam of the first reference signal resource; or determining beam indication information according to the beam report recently received for M times, wherein M is 1 or a positive integer greater than 1.

* * * * *